United States Patent
Schiebel et al.

(10) Patent No.: US 7,562,929 B2
(45) Date of Patent: Jul. 21, 2009

(54) DEFORMATION ELEMENT FOR ABSORBING LATERAL IMPACT FORCES IN A LATERAL REGION OF A MOTOR VEHICLE

(75) Inventors: Dieter Schiebel, Korntal-Münchigen (DE); Peter Baumann, Kieselbronn (DE); Michael Söllner, Grafenau-Döffingen (DE)

(73) Assignee: Dr. Ing. h. c. F. Porsche AG, Weissach (DE)

( * ) Notice: Subject to any disclaimer, the term of this patent is extended or adjusted under 35 U.S.C. 154(b) by 94 days.

(21) Appl. No.: 11/706,786

(22) Filed: Feb. 14, 2007

(65) Prior Publication Data

US 2007/0228776 A1    Oct. 4, 2007

(30) Foreign Application Priority Data

Mar. 31, 2006    (DE) .................. 10 2006 014 961

(51) Int. Cl.
   *B62D 25/02*    (2006.01)
(52) U.S. Cl. .................................. 296/187.12
(58) Field of Classification Search ............ 296/187.12, 296/193.05, 203.03, 209, 207; 180/311
   See application file for complete search history.

(56) References Cited

U.S. PATENT DOCUMENTS

| | | | |
|---|---|---|---|
| 4,934,751 A | 6/1990 | Shimoda | |
| 5,255,953 A * | 10/1993 | Frank | 296/146.6 |
| 5,398,989 A * | 3/1995 | Winter et al. | 296/203.03 |
| 6,293,618 B1 * | 9/2001 | Sukegawa et al. | 296/209 |
| 7,118,170 B2 * | 10/2006 | Montanvert et al. | 296/209 |
| 7,264,302 B2 * | 9/2007 | Nagashima | 296/187.12 |
| 2007/0152474 A1 * | 7/2007 | Lassl et al. | 296/187.12 |

FOREIGN PATENT DOCUMENTS

| | | |
|---|---|---|
| DE | 196 48 495 A1 | 5/1997 |
| DE | 196 15 875 A1 | 10/1997 |
| DE | 197 16 223 C1 | 11/1998 |
| DE | 199 43 296 A1 | 3/2001 |
| DE | 10 2004 014 796 A1 | 10/2005 |
| JP | 2001260945 A * | 9/2001 |
| JP | 2002029455 A * | 1/2002 |
| JP | 2004306801 A * | 11/2004 |
| WO | 2005/095184 A1 | 10/2005 |

* cited by examiner

*Primary Examiner*—H Gutman

(57) ABSTRACT

A deformation element for absorbing lateral impact forces in the lateral region of a motor vehicle has at least two hollow chambers disposed one behind another in the direction of action of the lateral impact forces. An axial extension of which is in each case oriented at right angles to the direction of action of the lateral impact forces. The deformation element has at least one fastening portion for mounting the deformation element on an associated lateral sill portion of the vehicle.

11 Claims, 6 Drawing Sheets

DEFORMATION ELEMENT FOR ABSORBING LATERAL IMPACT FORCES IN A LATERAL REGION OF A MOTOR VEHICLE

CROSS-REFERENCE TO RELATED APPLICATION

This application claims the priority, under 35 U.S.C. §119, of German application DE 10 2006 014 961.0, filed Mar. 31, 2006; the prior application is herewith incorporated by reference in its entirety.

BACKGROUND OF THE INVENTION

Field of the Invention

The present invention relates to a deformation element for absorbing lateral impact forces in a lateral region of a motor vehicle.

Although applicable to any vehicles and any regions of the vehicle, the present invention and the problem underlying it will be explained in greater detail in relation to the lateral region of the automobile.

Various solutions for improving lateral collision protection of passenger cells have already been proposed. In this connection, the majority are concentrated on reinforcing the doors by incorporating reinforcement elements between the outer side wall and the inner side wall of the door in the form of tubular constructions, profiled plates or the like. This is intended to achieve a rigid construction which undergoes only a certain maximum deformation under a given load. In certain cases, the doors are provided with reinforcement elements in their lowest part as well in order to use the bottom rail of the passenger cell as a supporting element. Door reinforcement elements have also been disposed in such a way that they form stops against the seat frame.

It is a disadvantage of all the known lateral reinforcement constructions that only a small mass of the whole vehicle that is collided with by another vehicle is available in lateral collisions in order to absorb the impact energy in the initial stage. In principle, only the deformation resistance of the door, or of the body side part collided with, and additionally the mass inertia of the seat and of the occupant oppose the active force after these, in the course of the deformation of the door or of the body part, have come into contact with the inner wall thereof. To begin with, the low deformation resistance of the door or of the body side part of the vehicle which has been collided with causes only a small reduction in speed of the vehicle driving into it. The door side moving at high speed or the body part moving at high speed therefore comes into contact with the occupant or the seat and subjects him or it to great acceleration relative to the vehicle in which they are located during the further deformation before the colliding vehicle and the vehicle collided with reach common end speeds.

U.S. Pat. No. 4,934,751 describes a side wall structure of a motor vehicle, in which a deformation element which has a number of chambers disposed one above another and extending in the longitudinal direction of the vehicle is disposed.

Such a deformation element serves merely to improve slightly the absorption of deformation energy acting in the transverse direction of the vehicle over an extensive region of the body side part.

SUMMARY OF THE INVENTION

It is accordingly an object of the invention to provide a deformation element for absorbing lateral impact forces in a lateral region of a motor vehicle which overcomes the above-mentioned disadvantages of the prior art devices of this general type, which ensures improved absorption of lateral impact forces or lateral impact energy in a simple, cost-effective way.

With the foregoing and other objects in view there is provided, in accordance with the invention, The idea underlying the invention is that the deformation element for absorbing lateral impact forces in the lateral region of the motor vehicle contains at least two hollow chambers disposed one behind another in the direction of action of the lateral impact forces, the axial extension of which is in each case oriented approximately at right angles to the direction of action of the lateral impact forces, and at least one fastening portion for mounting the deformation element on an associated lateral sill portion of the vehicle.

Therefore, the invention has the advantage in relation to the solutions mentioned above that the hollow chambers of the deformation element are disposed one behind another in the direction of the active lateral impact forces or of the impact energy in such a way that impact energy can be absorbed by all the hollow chambers provided. Advantageously, a constant energy degradation takes place over the entire deformation path. Overall, this ensures better lateral impact protection in the event of a lateral collision as each individual hollow chamber makes a contribution to the energy absorption. Such a deformation element makes it possible to optimize energy absorption in the case of a predetermined installation volume for the deformation element.

According to a preferred development, the deformation element is made in the form of an extruded profile and supported in the vertical direction on and fastened to an associated sill reinforcement. The deformation element preferably contains, seen in the lateral impact direction, three hollow chambers disposed one behind another, which have different cross-sectional profiles. The lateral walls of the deformation element are advantageously configured with an undulating shape or like corrugated sheet to ensure the different cross-sectional profiles, the two outer hollow chambers have a larger cross section than the central hollow chamber. The deformation element is advantageously disposed in the region of the B pillar and in the direction of action of an associated transverse stiffening element of a seat transverse beam for the lateral impact protection.

Other features which are considered as characteristic for the invention are set forth in the appended claims.

Although the invention is illustrated and described herein as embodied in a deformation element for absorbing lateral impact forces in a lateral region of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
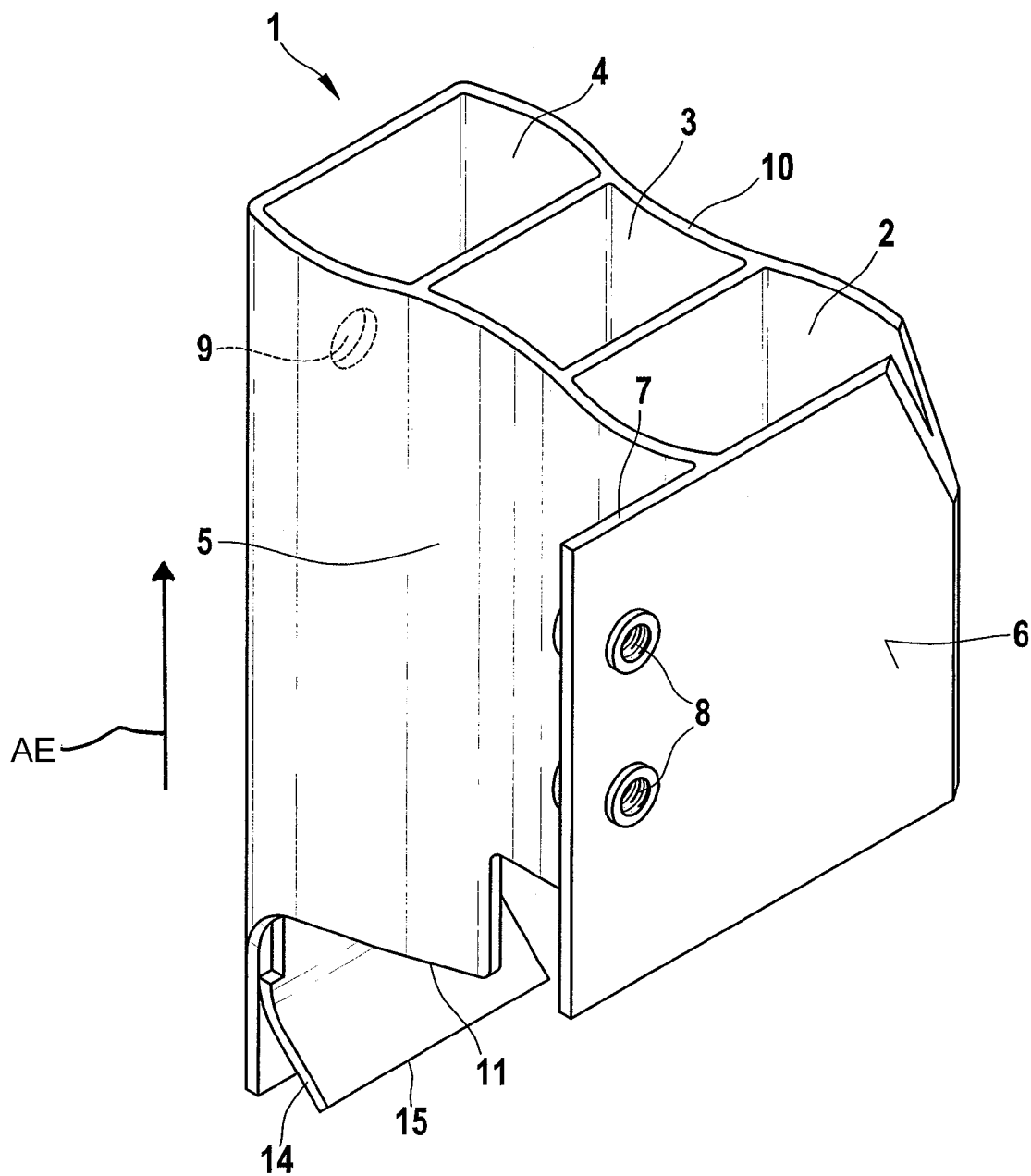
FIG. 1 is a diagrammatic, perspective view of a deformation element according to a preferred illustrative embodiment of the invention.

In all the figures of the drawing, the same reference signs designate the same or functionally identical components unless otherwise indicated. Referring now to the figures of the drawing in detail and first, particularly, to FIGS. 1-4 thereof, there is shown a deformation element 1 formed of three hollow chambers disposed one behind another in a direction of action of deformation forces—an inner hollow chamber 2 facing the vehicle interior, a central hollow chamber 3 and an outer hollow chamber 4 facing the vehicle exterior. However, it is clear for a person skilled in the art that the deformation element according to the invention can also contain only two or more than three hollow chambers disposed one behind another in the direction of action.

The three hollow chambers 2, 3 and 4 are preferably, when mounted on an associated lateral sill reinforcement element, disposed behind another in the direction of action of the lateral impact forces in such a way that each of the three hollow chambers 2, 3 and 4 makes a contribution to the absorption of the impact energy to be absorbed. Furthermore, when mounted on the associated lateral sill reinforcement element, the hollow chambers 2, 3, 4 extend in an approximately vertical direction or axial extension AE direction, that is to say at right angles to the longitudinal extension of the lateral sill reinforcement element, the deformation element 1 preferably being supported on the lateral sill reinforcement element and fastened to it in an appropriate way, which is explained in greater detail below.

The deformation element 1 is preferably produced in the form of an extruded profile made from an appropriate aluminium alloy or the like. Such light metal alloys have great rigidity and low weight and are therefore especially appropriate for motor vehicle construction.

Figure 2:
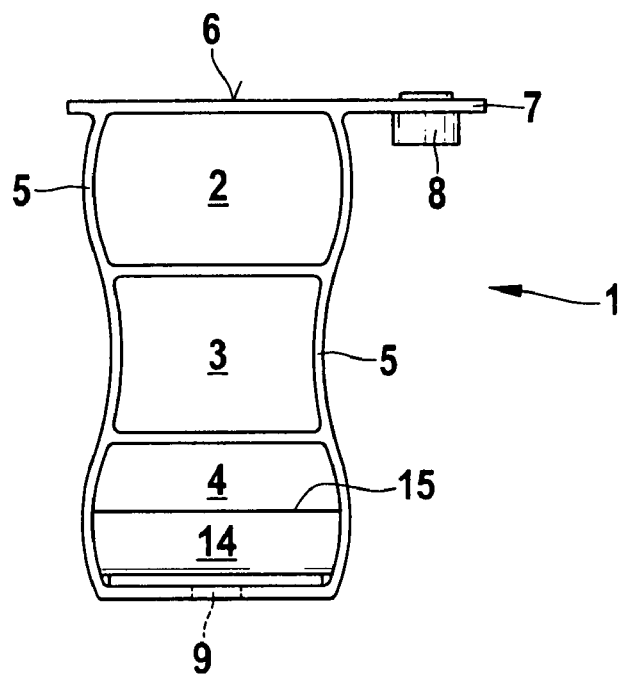
FIG. 2 is a diagrammatic, top plan view of the deformation element shown in FIG. 1.
Figure 3:
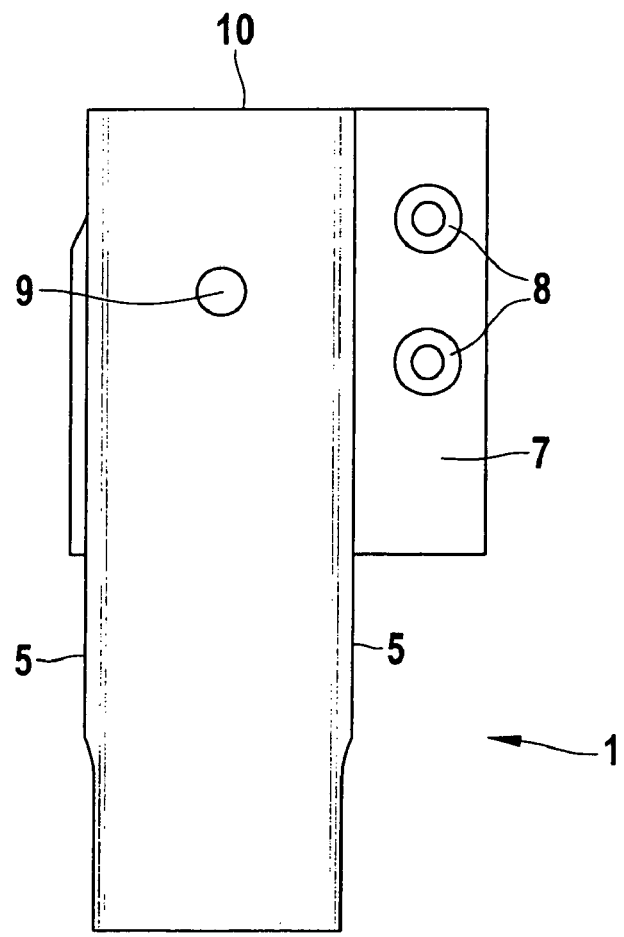
FIG. 3 is a diagrammatic, rear view of the deformation element shown in FIGS. 1 and 2.

The side walls 5 extending in the transverse direction of the vehicle of the deformation element 1 preferably have an undulating shape, as illustrated in particular in FIGS. 1 and 2. Advantageously, the side walls 5 have wave crests in a region of the inner hollow chamber 2 and of the outer hollow chamber 4 and wave troughs in a region of the central hollow chamber 3 in such a way that the concertina shape illustrated in FIG. 1 of the hollow chambers 2, 3 and 4 disposed one behind another is ensured. The inner hollow chamber 2 and the outer hollow chamber 4 are, on account of the wave crests, provided in these regions, of the undulating side walls 5, configured with a larger cross-sectional profile than the central hollow chamber 3 provided in the region of the wave troughs of the undulating side walls 5. On the other hand, the cross-sectional profiles of the inner hollow chamber 2 and the outer hollow chamber 4 are configured with a cross-sectional profile of approximately the same size. This gives rise, when force acts on the end side of the outer hollow chamber 4 in the event of a lateral accident, to a concertina effect, which brings about a uniform deformation of the deformation element 1 that proceeds in a defined manner. A constant and defined energy degradation of the deformation energy arising takes place over the entire deformation path, so that improved lateral impact protection is provided.

According to the present illustrative embodiment, the three hollow chambers 2, 3 and 4 have approximately the same depth dimensions in the transverse direction of the vehicle, so that an approximately constant energy degradation is ensured over the entire deformation path.

Furthermore, the deformation element 1 preferably contains a bearing surface 6 on the end side of the inner hollow chamber 2, the surface 6 serving as a bearing surface for the deformation element 1 against an associated body side part. The bearing surface 6 is, for example, configured to project toward at least one side of the deformation element 1, in order to provide a portion 7 with, for example, two rivet nuts 8. The deformation element 1 can be fastened to a coupling element of an associated transverse stiffening element 19 via the rivet nuts 8. An introduction of force into the vehicle body when lateral impact occurs can thus take place both via the lateral sill reinforcement element 12 and via the coupling element of the transverse stiffening element 19.

The deformation element 1 also contains, on the end side of the outer hollow chamber 4 for example, a central fastening hole 9, which serves for locating it in a positioning device during a positioning process, for example during welding of the deformation element 1 to a lateral sill reinforcement element 12.

Figure 4:
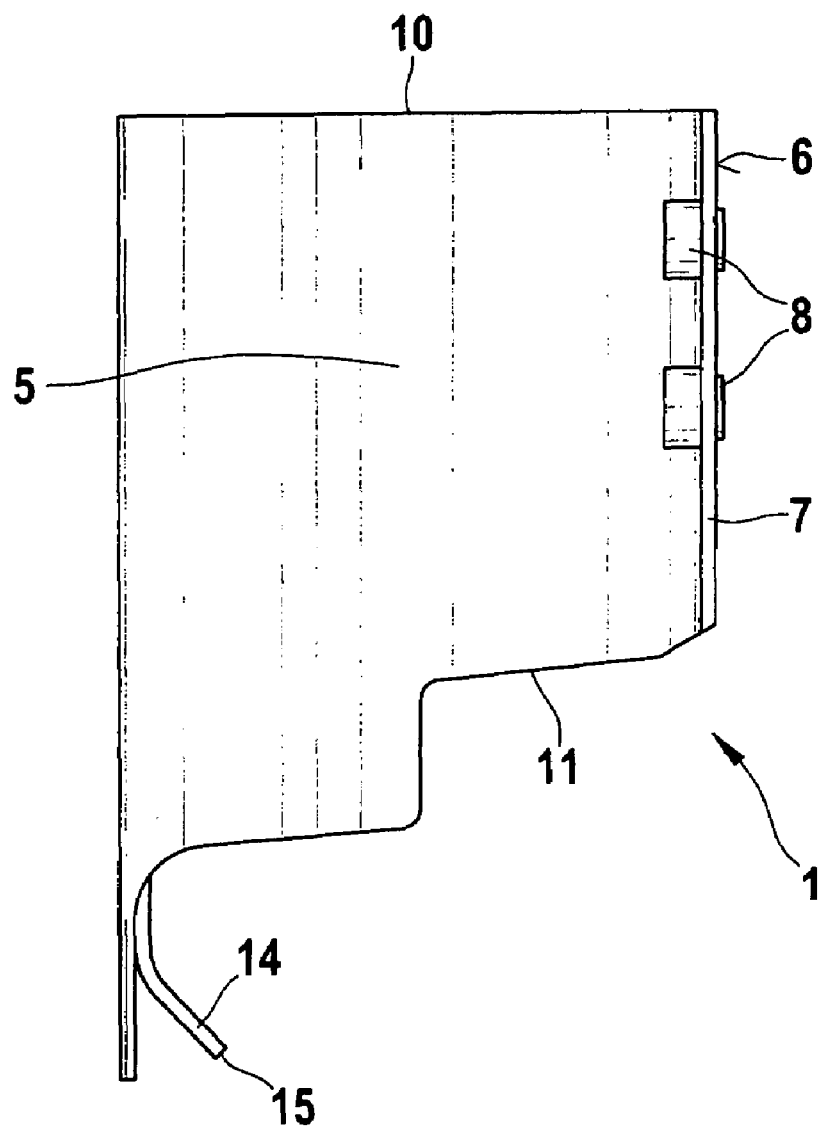
FIG. 4 is a diagrammatic, right-hand side view of the deformation element shown in FIGS. 1 to 3.
Figure 5:
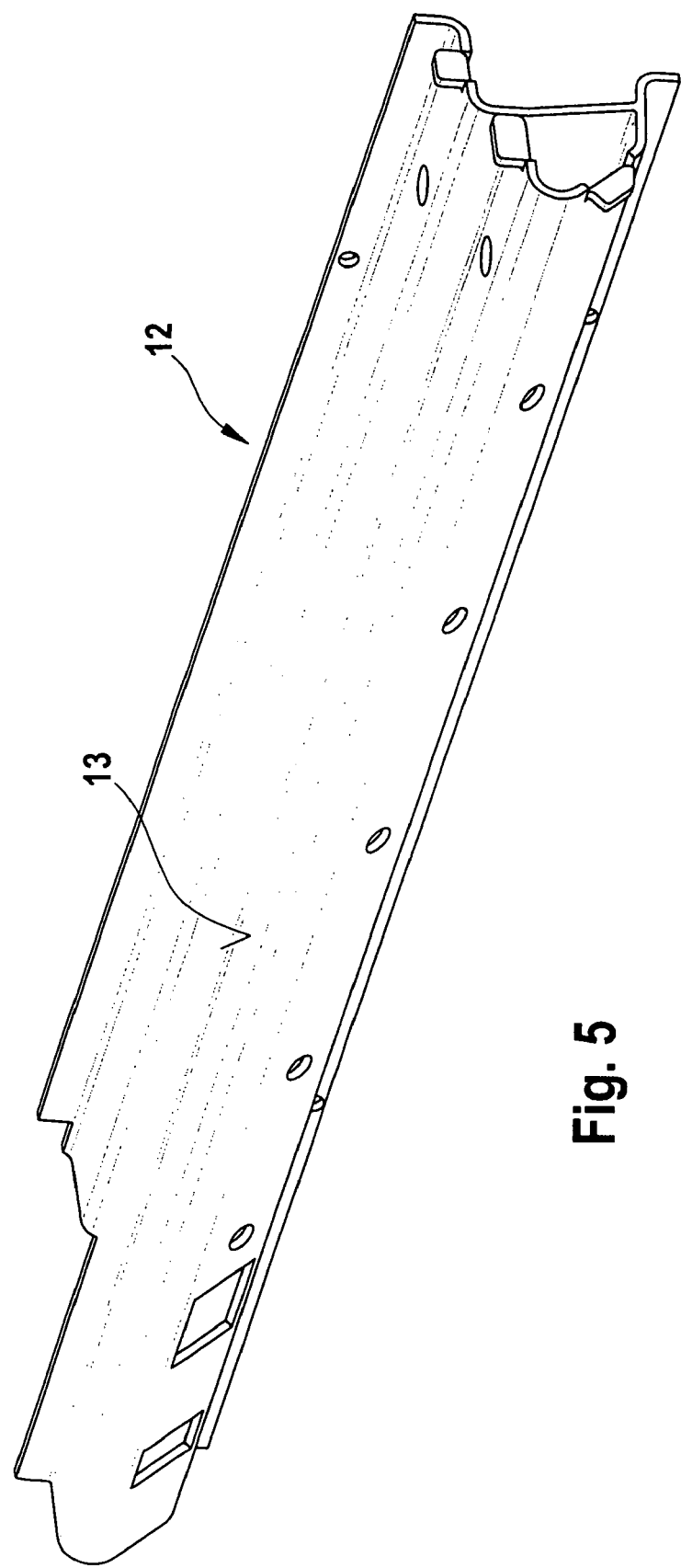
FIG. 5 is a diagrammatic, perspective view of a lateral sill reinforcement according to a preferred illustrative embodiment of the invention.
Figure 6:
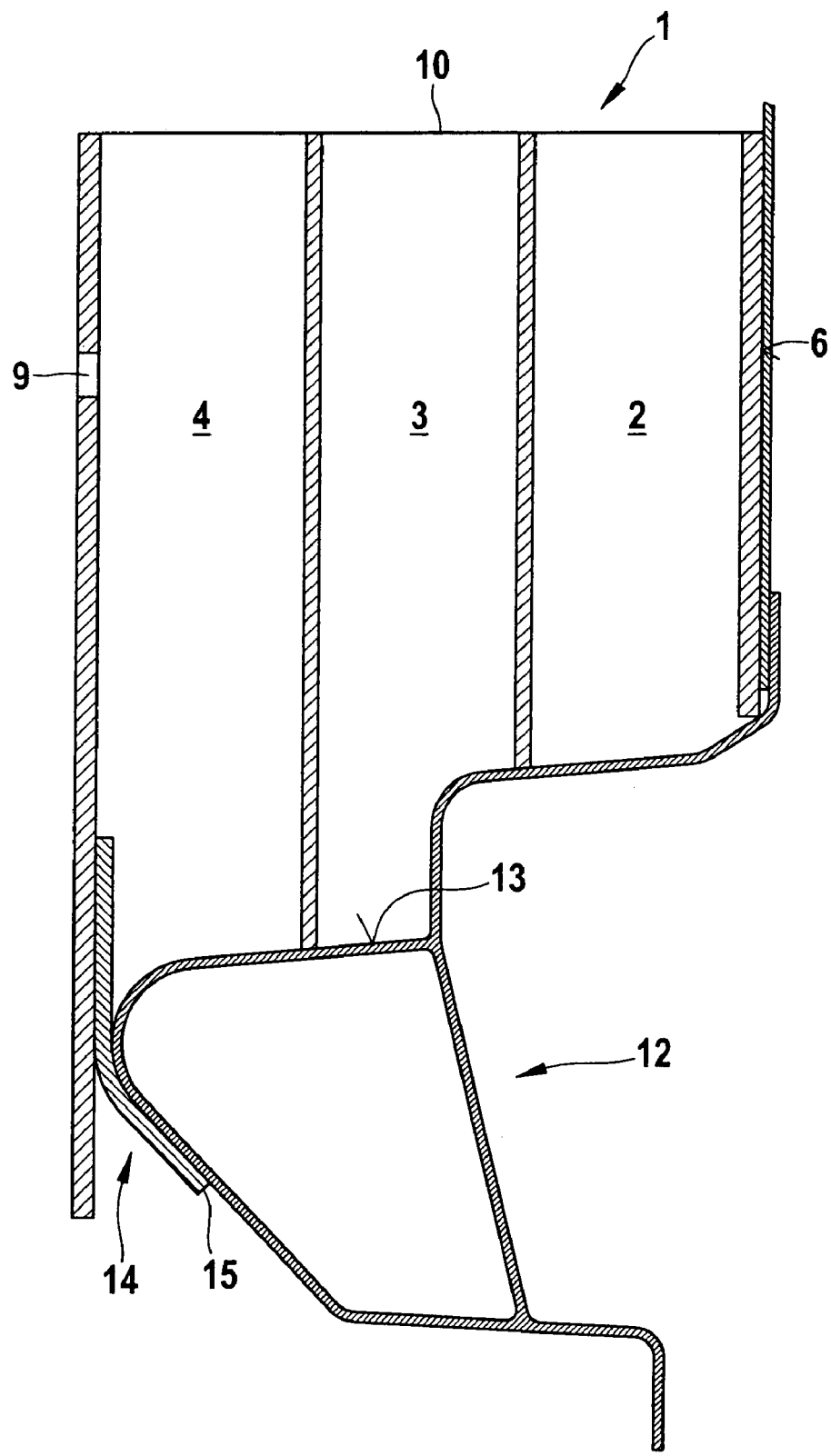
FIG. 6 is a diagrammatic, cross-sectional view of the deformation element according to the preferred illustrative embodiment of the invention mounted on the sill reinforcement according to FIG. 5.

As can be seen in FIG. 4 in particular, an upper side 10 of the deformation element 1 is preferably plane and a lower side 11 of the deformation element is of step-shaped configuration for appropriate support on the associated lateral sill reinforcement element 12, which is shown by way of example in FIG. 5 in a perspective view. The step-like shape of the lower side 11 of the deformation element 1 is preferably of complementary configuration to the step-shaped surface 13 of the associated lateral sill reinforcement element 12 for flush support thereon, as shown diagrammatically in FIG. 6 in a cross-sectional illustration.

Furthermore, the deformation element 1 contains a fastening portion 14, which is configured, for example, as a flange angled toward the vehicle interior, in the lower region facing the vehicle exterior. The fastening portion 14, as illustrated in particular in FIG. 1, contains an edge 15 for fastening the fastening portion 14 and therefore the deformation element 1 to the associated lateral sill reinforcement element 12 preferably by a welding process. It is clear for a person of average skill in the art that different common connection methods are also possible for mounting the deformation element on the associated lateral sill reinforcement element 12 or possibly on an associated body side part.

Figure 7:
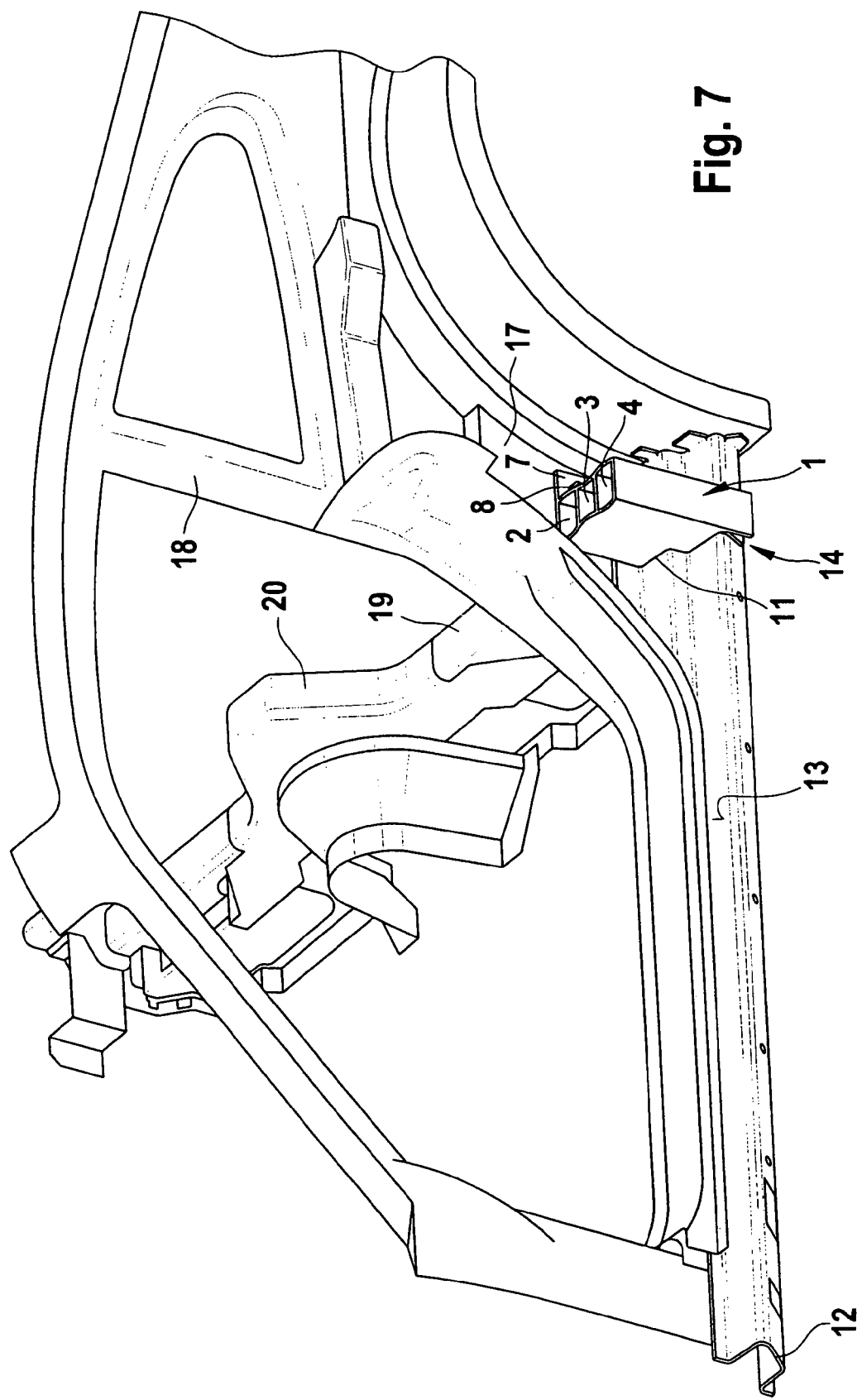
FIG. 7 is a diagrammatic, perspective partial view of a vehicle body with an integrated deformation element according to a preferred illustrative embodiment of the present invention.

FIG. 7 illustrates a perspective view of the deformation element 1 mounted on and fastened to the associated lateral sill reinforcement element 12, the deformation element 1 moreover being in contact with an associated inner body side part 17. The deformation element 1 is preferably provided in the region of a B pillar 18 with a vertical orientation of the hollow chambers 2, 3, 4 in such a way that it lies directly opposite the associated transverse stiffening element 19 on the rear side of the inner body side part 17 in the direction of action of the lateral impact forces. This ensures a load path via the deformation elements 1, the associated inner body side parts 17, the transverse stiffening elements 19 and a central seat transverse beam 20 from one deformation element to the opposite deformation element. With the deformation element according to the invention, the present invention consequently provides improved transverse stiffening of a transverse beam structure and increased occupant safety in the event of lateral collisions owing to improved absorption of the impact energy generated.

Although the present invention has been described above using preferred illustrative embodiments, it is not limited to these but can be modified in various ways.

We claim:

1. A deformation element for absorbing lateral impact forces in a lateral region of a motor vehicle, the deformation element comprising:
   a deformation body having at least three hollow chambers formed therein and disposed one behind another in a direction of action of the lateral impact forces, said deformation body having undulated side walls of an undulating configuration for forming said hollow chambers with different cross-sectional profiles, one of said three hollow chambers being an inner hollow chamber facing a motor vehicle interior, one of said three hollow chambers being an outer hollow chamber facing a vehicle exterior, and one of said three hollow chambers being a central hollow chamber disposed between said outer and said inner hollow chambers, an axial extension of said hollow chambers being oriented approximately at right angles to the direction of action of the lateral impact forces; and
   at least one fastening portion for mounting said deformation body on an associated lateral sill portion of the motor vehicle, said fastening portion extending from said deformation body.

2. The deformation element according to claim 1, wherein said deformation body is configured to be brought into contact with an associated inner body side part in a region of a B pillar of the motor vehicle and at a level of an associated lateral transverse stiffening element of the motor vehicle and is configured to be mounted on the associated lateral sill reinforcement element of the motor vehicle.

3. The deformation element according to claim 2, wherein said hollow chambers extend axially approximately at right angles to a longitudinal extension of the associated lateral sill reinforcement element and approximately at right angles to a longitudinal extension of the associated lateral transverse stiffening element.

4. The deformation element according to claim 2, wherein said deformation body has a lower side facing the associated lateral sill reinforcement element and configured with a step-shaped form complementary to a profile of the associated lateral sill reinforcement element for appropriate support thereon.

5. The deformation element according to claim 2, wherein said fastening portion is a flange portion disposed in a lower region of said deformation body, points in the direction of the associated lateral sill reinforcement element and contains an edge for fastening said deformation body to the associated lateral sill reinforcement element by a welding process.

6. The deformation element according to claim 1, wherein:
   said undulated side walls have wave crests and wave troughs; and
   said hollow chambers have approximately equivalent depth dimensions, said inner and said outer hollow chambers are provided in a region of said wave crests and said central hollow chamber is provided in a region of said wave troughs of said undulated side walls in such a way that said inner and said outer hollow chambers have approximately equivalent widths and are configured with greater widths than said central hollow chamber.

7. The deformation element according to claim 1, wherein said deformation body is an extruded profile.

8. The deformation element according to claim 7, wherein said extruded profile is made from a metal alloy.

9. The deformation element according to claim 7, wherein said extruded profile is made from an aluminum alloy.

10. A deformation element for absorbing lateral impact forces in a lateral region of a motor vehicle, the deformation element comprising:
    a deformation body having at least three hollow chambers formed therein and disposed one behind another in a direction of action of the lateral impact forces, one of said three hollow chambers being an inner hollow chamber facing a motor vehicle interior, one of said three hollow chambers being an outer hollow chamber facing a vehicle exterior, and one of said three hollow chambers being a central hollow chamber disposed between said outer and said inner hollow chambers, said outer and said inner hollow chambers in each case having larger cross-sectional profiles than said central hollow chamber, an axial extension of said hollow chambers being oriented approximately at right angles to the direction of action of the lateral impact forces; and
    at least one fastening portion for mounting said deformation body on an associated lateral sill portion of the motor vehicle, said fastening portion extending from said deformation body.

11. A deformation element for absorbing lateral impact forces in a lateral region of a motor vehicle, the deformation element comprising:
    a deformation body having at least three hollow chambers formed therein and disposed one behind another in a direction of action of the lateral impact forces, one of said three hollow chambers being an inner hollow chamber facing a motor vehicle interior, said inner hollow chamber having a bearing surface for bearing against the associated inner body side part, one of said three hollow chambers being an outer hollow chamber facing a vehicle exterior, and one of said three hollow chambers being a central hollow chamber disposed between said outer and said inner hollow chambers, an axial extension of said hollow chambers being oriented approximately at right angles to the direction of action of the lateral impact forces, said deformation body is configured to be brought into contact with an associated inner body side part in a region of a B pillar of the motor vehicle and at a level of an associated lateral transverse stiffening element of the motor vehicle and is configured to be mounted on the associated lateral sill reinforcement element of the motor vehicle, said bearing surface having a lateral portion with rivet nuts for attachment to a coupling element of the associated lateral transverse stiffening element; and
    at least one fastening portion for mounting said deformation body on an associated lateral sill portion of the motor vehicle, said fastening portion extending from said deformation body.

* * * * *